(12) United States Patent
Dvir (10) Patent No.: US 7,899,267 B2
(45) Date of Patent: Mar. 1, 2011

(54) DYNAMIC RANGE COMPENSATION BY FILTER CASCADE

(75) Inventor: Itsik Dvir, Haifa (IL)

(73) Assignee: Zoran Corporation, Sunnyvale, CA (US)

( * ) Notice: Subject to any disclaimer, the term of this patent is extended or adjusted under 35 U.S.C. 154(b) by 887 days.

(21) Appl. No.: 11/752,797

(22) Filed: May 23, 2007

(65) Prior Publication Data

US 2008/0291287 A1 Nov. 27, 2008

(51) Int. Cl.
*G06K 9/40* (2006.01)
(52) U.S. Cl. ........ 382/274; 382/260; 382/275; 358/3.26; 358/3.27
(58) Field of Classification Search ........... 382/260, 382/274, 275
See application file for complete search history.

(56) References Cited

U.S. PATENT DOCUMENTS

| | | | |
|---|---|---|---|
| 4,466,018 A | 8/1984 | Soneda et al. | |
| 6,788,822 B1 | 9/2004 | Zhang et al. | |
| 6,807,299 B2 | 10/2004 | Sobol | |
| 6,822,762 B2 | 11/2004 | Moroney et al. | |
| 6,862,373 B2 | 3/2005 | Enomoto | |
| 6,975,418 B1 * | 12/2005 | Ohta et al. | 358/1.15 |
| 6,982,811 B2 * | 1/2006 | Sato | 358/1.4 |
| 7,088,388 B2 | 8/2006 | MacLean et al. | |
| 7,158,686 B2 | 1/2007 | Gindele | |
| 7,321,112 B2 * | 1/2008 | Stam et al. | 250/216 |
| 7,358,502 B1 * | 4/2008 | Appleby et al. | 250/370.14 |
| 2003/0038957 A1 | 2/2003 | Sharman | |
| 2004/0150732 A1 | 8/2004 | Yamanaka | |
| 2004/0227978 A1 | 11/2004 | Enomoto | |
| 2006/0062562 A1 | 3/2006 | Utagawa | |

OTHER PUBLICATIONS

Choudhury et al., "The Trilateral Filter for High Contrast Images and Meshes," *Eurographics Symposium on Rendering*, 2003, pp. 1-11.

(Continued)

*Primary Examiner* — Yosef Kassa
(74) *Attorney, Agent, or Firm* — Perkins Coie LLP (57) ABSTRACT

A local method uses a cascade of multiple nonlinear edge preserving filters, and nonlinear pixel point operations, to calculate the pixel gain. Multiple low-pass filters are used, being applied to surrounding neighborhoods of the current pixel of narrow and of wide extent. The number of filter stages may be determined based on the image content. The coefficients used to combine a gray level image extracted from the input image with the ascending scale regions can be automatically extracted from high-pass filtered images of the ascending scale regions. Multiplying each color component of the input image by one or more pixel dependent gain or attenuation factors, using a nonlinear mapping function that can lighten shadow regions as well as darken bright regions, generates the output image.

106 Claims, 2 Drawing Sheets

OTHER PUBLICATIONS

Perona et al., "Scale-Space and Edge Detection Using Anisotropic Diffusion," *University of California Berkeley*, Dec. 20, 1988, pp. 1-30.

Fattal et al., "Gradient Domain High Dynamic Range Compression," *ACM Transactions on Graphics, Special Isue on Proc. of ACM Sig-Graph*, 2002, San Antonio Texas, vol. 21(3), pp. 257-266.

Tomasi et al., "Bilateral Filtering of Greay and Colored Images," *Proc, IEEE Intl. Conference on Computer Vision*, 1998, pp. 836-846.

Duran et al., "Fast Bilateral. Filtering for the Display of High-Dynamic Range Images," *ACM Transactions on Graphics, Special Issue on Proc. of ACM Sig-Graph*, 2002, San Antonio, Texas, vol. 21(3), pp. 249-256.

Gilboa et al., "Complex Diffusion Processes for Image Filtering," *Proc. Conf. Scale-Space*, 2001, pp. 299-307. Wong, "Image Enhancement by Edge-Preserving Filtering," *First IEEE International Conference on Imaging Processing*, Austin, Texas, Nov. 13-16, 1994, 6 pages.

Boult, "Correcting Chromatic Aberrations Using Image Warping," *Center for Research in Intelligent Systems, Columbia University, Department of Computer Science*, 1992, 15 pages.

Boult, Local Image Reconstruction and Sub-Pixel Restoration Algorithms, *Graphical Models and Image Processing*, vol. 55, No. 1, Jan. 1993, pp. 1-12.

\* cited by examiner

FIG. 4

DYNAMIC RANGE COMPENSATION BY FILTER CASCADE

BACKGROUND

This application relates to image processing in digital camera, video, and other electronic digital image acquisition and or display devices, and particularly to techniques of improving the apparent dynamic range of such images.

Most digital images encode only a small fraction of the intensities a human observer can see in a real scene. Detail visible to the human eye is lost in dim and bright portions of the image due to the limited dynamic range of the image sensor and/or display device. For example, current image sensors provide contrast ratios in the range of 200:1 (a dynamic range of about 46 dB). Even if the raw dynamic range of the image-sensing device were to improve by a factor of 5, to 60 dB, further improvements would still be required in order to approach the performance of the human visual cortex, having a dynamic range approaching 80 dB.

Various methods have been suggested over the past decades for input-output intensity mapping of digital image data, in order to enhance the perception of image details at the extreme ends of a system's dynamic range. Methods fall into two broad classes, iterative solutions and non-linear filtering. Iterative solutions gradually, and repeatedly, modify an initial image towards infinite exposure time by employing a discretized partial differential equation (PDE), such as used to emulate heat transfer (see, for example, Choudhury and Tumblin, "The Trilateral Filter for High Contrast Images and Meshes", *Eurographics Symposium on Rendering* 2003, pp. 1-11, 2003). These methods combine smoothing and edge sharpening into a single iterative process. Anisotropic diffusion (see, for example, Perona and Malik, "Scale space and edge detection using anisotropic diffusion", *IEEE Transaction Pattern Analysis and Machine Intelligence*, vol. 12(7), pp. 629-639, 1990) and gradient (see, for example, Fattal et at., "Gradient domain high dynamic range compensation", *ACM Transactions on Graphics, special issue on Proc. Of ACM SIG-GRAPH* 2002, San Antonio, Tex., vol, 21(3), pp. 257-266, 2002) approaches are among these methods. Non-linear filter methods compute each output pixel separately as a position-dependent function of input pixels in a local neighborhood. Non-Linear filters obtain good-quality edge preserving smoothing in a single pass. They can produce PDE like results without a time-consuming iterative solution or possible risks of instability (e.g., Choudhury and Tumblin, 2003, cited above). This class starts with Edwin H. Land's classic Retinex work and continued by others, which led to Bilateral-filtering (see, for example, Tomasi and Manduchi, "Bilateral filtering of gray and colored images", *Proc. IEEE Intl. Conference on Computer Vision, pp.* 836-846, 1998, or Duran and Dorsey, "Fast bilateral filtering for the display of high-dynamic range images", *ACM Transactions on Graphics, special issue on Proc. Of ACM SIG-GRAPH* 2002, San Antonio, Tex., vol. 21(3), pp. 249-256, 2000).

These various prior art methods tend to have a number of shortcoming when it come to implementation in digital cameras and video, such as the amount of processing power needed for setting or predetermining the coefficients which weight scaled filtered images. Consequently, given the difference in dynamic range between digital image systems and the human visual system, there is substantial room for improvements in digital imaging systems.

SUMMARY

The described methods and corresponding apparatus provide ways to achieve superior image quality as compared to previous image dynamic range compensation approaches. A cascade of filters of ascending scale is used to obtain the desired dynamic range enhancement, while preserving edge detail, as needed, by optionally specifying the number of filters in the cascade. Additionally, the automatic extraction of the filter weighting coefficients can be incorporated.

A local method uses a cascade of nonlinear edge preserving filters, and pixel point operations, to calculate the pixel gain or other pixel characteristics that can be employed to make image detail more visible. An exemplary embodiment uses a non-linear combination of a gray level image, L, extracted from the input image and two or more gray images obtained by applying 2-dimensional low-pass filters to ascending scale regions of the image. In an exemplary implementation, a pair of low-pass filters is used, being applied to surrounding neighborhoods of the current pixel of narrow and of wide extent. Alternatively, many low-pass filters can be employed in order to obtain finer edge preserving transitions. The coefficients used to combine L with the ascending scale regions can be automatically extracted from high-pass filtered images of the ascending scale regions. Multiplying each color component of the input image by one or more pixel dependent gain or attenuation factors, using a nonlinear mapping function that can lighten shadow regions, darken highlight regions or change the chromaticity of pixels in either of these regions, generates the output image. Altering input image pixel chromaticity (color balance) can be used separately, or in combination with, overall pixel gain adjustment to further enhance the appearance of image details in regions of the image close to positive (the highlight regions) or negative (the shadow regions) saturation.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION OF EXEMPLARY EMBODIMENTS

The methods presented below use a cascade of nonlinear edge preserving filters, and nonlinear pixel point operations, to calculate the pixel gain or other pixel characteristics, such as chromaticity, that can be employed to make image detail more visible. It suggests a new non-linear combination of a plurality of gray level images, L, of $L_n$ through $L_w$, where L is a gray image extracted from the input image, L=log(max(R, G,B), and $L_n$ through $L_w$ are gray images obtained by applying 2-dimensional low-pass filters to ascending scale regions from the narrow ($L_n$) to the wide ($L_w$) of the image. In one exemplary implementation, two low-pass filters are applied to surrounding neighborhoods of the current pixel of narrow and of wide extent. In other cases, the filter sections could be used individually. Alternatively, many low-pass filters can be employed in order to obtain finer edge preserving transitions. The coefficients used to combine L with its neighbors $L_n$ through $L_w$ are automatically extracted from high-pass filtered images $H_n$=L–$L_n$, through $H_w$=L–$L_w$. Multiplying each color component of the input image by one or more pixel dependent gain or attenuation factors, using a nonlinear mapping function that may either lighten shadow regions or darken highlights or change the chromaticity of pixels in either of these regions, generates the output image. Altering input image pixel chromaticity (color balance) can be used separately, or in combination with, overall pixel gain adjustment to further enhance the appearance of image details in regions of the image close to positive (the highlight regions) or negative (the shadow regions) saturation.

Overview

The following section presents an overview of some of the various aspects of the dynamic range compensation method, flow, and apparatus. Although the implementation discussed here is presented in terms of hardware for expository purposes, implementations based on firmware, software, or various combinations can be used for the concepts discussed. Furthermore, the first implementation described is a basic configuration, using just two low pass filters for the calculation cascade; more refined implementations using additional filter sections are discussed further down.

The various embodiments presented below use the current pixel in conjunction with a plurality of signals derived from one or more successively widening neighborhoods to refine the estimate of the enhancement gain for the current pixel. The process is preferably performed after color interpolation, that is, demosaicing of Bayer grid sensor image data when a Bayer grid format sensor is employed, so there is no need to estimate the color components of the current pixel; rather, the near neighborhood of the current pixel may be used in the tone enhancement process to determine the pixel gain, in addition to the (at least one other) wider neighborhoods. This approach differs from the prior art in the use of a cascade of widening scales, or neighborhoods, in determining the dynamic range modification to be performed, as well as, in the automatic extraction of the coefficients. Although the following discussion is given in terms of a single gain factor for each pixel, more generally this can be one or more pixel dependent gain or attenuation factors or other factors, such as changing the chromaticity of pixels in either shadow regions or highlights, that can enhance the perception of image details at the extreme ends of a system's dynamic range.

Figures 1, 2, 3:
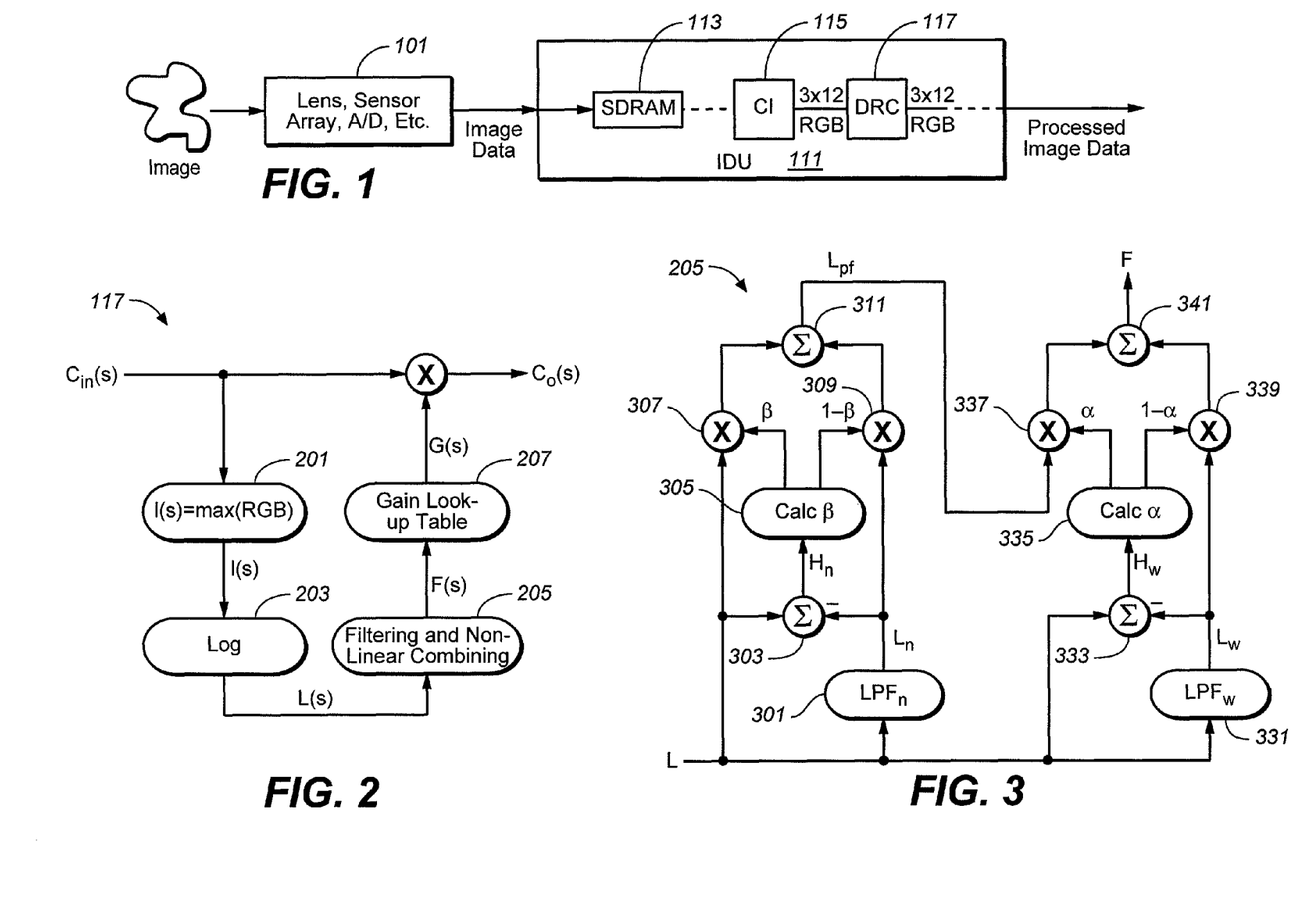
FIG. 1 illustrates an example of an Image Processing Unit (IPU) of a camera or other video acquisition device in which the exposure control techniques of the present invention may be implemented.
FIG. 2 is a block diagram of a basic dynamic range compensation embodiment.
FIG. 3 illustrates a basic embodiment of the filtering and non-linear combination operation.

FIG. 1 is a block diagram of some elements of an imaging system, such as a digital still or video camera. The image is captured at block 101, which schematically represents the various front end elements (lens, sensor array, analog to digital conversion, etc.) that precede the Image Processing Unit (IPU) 111 and supply the image to the IPU. The image data can be supplied to the IPU as raw image, RGB, YCbCr422, YCbCr444, or other format where it can be received in a SDRAM 1113, for example. The IPU will generally contain a number of additional elements, implemented in hardware, software, or some combination of these, as is familiar in the art, but which are suppressed here for simplification of the discussion. In this embodiment, the block labeled DRC (Digital Range Compensation) 117 in the middle of the processing chain receives a 3-color×12 bit linear RGB image constructed by, in this embodiment, the Color Interpolation (CI) unit 115 if needed, The RGB output image of the DRC block, here again taken as being a 3 color×12 bit linear RGB image, is then processed by the rest of the Image Processing Unit (IPU) pipeline and, typically, eventually JPEG encoded. More generally, other formats for the image data, such as 3×8 non-linear RGB, YUV, and so on, can be used. Additionally, the DRC block 117 can be located in other locations within the image processing pipeline.

A basic configuration for the DRC module is schematically diagrammed in FIG. 2. It computes a gain (or attenuation), G(s), for each sensor pixel, s=(i,j). Each color component ($C_{in}$) of the input RGB image ($R_{in}$, $G_{in}$, $B_{in}$) is multiplied by G(s) to produce the output color component for that pixel $C_o$(s):

$$Co(s)=G(s)*Cin,$$

where C=R, G or B and in the above equation, and following discussion, '*' stands for multiplication. Note that the gain determined from an L(s) in one format, such as RGB, may be applied to other image data format, such as YUV HSV and so on. Although the exemplary embodiment using a single G(s) for all channels at a given pixel, more generally differing factors can be used for the different channels in image data formats that more than a single channel per pixel.

As shown in FIG. 2, the color components of the input RGB image is received at block 201 where the gray intensity image, I(s), is determined as the maximum value of the three color components of the input image pixel ($R_{in}$, $G_{in}$, $B_{in}$):

$$I(s)=\max(R_{in}(s), G_{in}(s), B_{in}(s)).$$

This differs from other methods, which use the luminance (Y) as in YCbCr, YUV, or other combination (e.g., Y=0.3R+0.6G+0.1B), and may suffer from color saturation. Instead, the present embodiment uses the max(R,G,B), which is more suitable to prevent color saturation.

In block 203, the log of I(s) is formed by means of a look-up table, or by other computational means:

$$L(s)=\text{Log}(I(s)).$$

L(s) then serves as the measure of the image strength that is input into block 205 where low pass filtering and non-linear combining are performed to produce an image, F(s), where details of this process in the basic embodiment are given with respect to FIG. 3. The image F(s) is applied to a gain look-up table, 207, to determine the gain values, G(s).

Filtering and Non-Linear Combining

The filtering and non-linear processing to determine F(s) from L(s) are schematically diagrammed in FIG. 3. In this basic embodiment, L(s) is applied to two cascaded 2-dimensional low-pass filters, respectively using narrow and wide neighborhoods of the pixel being treated, in order to form images $L_n$ and $L_w$. These images are formed from narrow (e.g., ~5×5 pels) and wide window support, respectively. The width of the wide window can be dependent on the image width; for example, it could be set as a percentage (e.g., 2% or 10%) of the image width. Rote that although the discussion given here is for an embodiment having at least two filter stages, single stage embodiments can also be used for some embodiments to compute gain or chromaticity factors.)

As shown in FIG. 3, L(s) is received at the first stage of the filter, where it filtered by the narrow window low pass filter (LPF$_n$) 301 to produce $L_n$. $L_n$ is then combined with L in adder 311 to form the linear combination $L_{pF}$ as output, where the coefficients of the combination are determined at 305 from Hn, the high-pass filtered of L, at adder 303 and are applied at 307 and 309. The second stage of the filter is constructed similarly to the first stage, except that the low-pass filter $LPF_w$ 331 now uses the wide support window and the output F(s) is now the linear combination of the low-pass filtered signal and the output of the preceding stage $L_{pF}(S)$ (hence, the cascading) instead of the input signal L(s).

More specifically, the high-pass filter images $H_n$ and $H_w$ are respectively formed in the adders 303 and 333 by subtracting $L_n$ and $L_w$ from the input signal L:

$$H_n(s)=L(s)-L_n(s);$$

$$H_w(s)=L(s)-L_w(s).$$

The non-linear, pixel dependent coefficients α and β are respectively extracted from the high pass filter images at 305 and 335 using nonlinear mapping functions beta($H_n$) and alpha($H_w$):

$$\beta=\text{beta}(H_n);$$

$$\alpha=\text{alpha}(H_w)$$

In a basic embodiment, the nonlinear mappings beta($H_n$) and alpha($H_w$) can be predetermined.

Finally, the cascaded output F(s) is formed by combining L with $L_n$ and $L_w$ according to the following equations:

$$F=\alpha*L_{pF}+(1-\alpha)*L_w;$$

$$L_{pF}=\beta*L+(1-\beta)*L_n;$$

where these combinations are respectively formed in adders 341 and 311.

A simple example of a possible set of non-linear functions is given below:

$$\text{beta}(s) = \begin{cases} 0 & H_n\{s\} < ThrHnLow \\ 1 & H_n\{s\} > ThrHnHigh \\ HnSlp*\{H_n(s) - ThrHnLow\} & \text{otherwise} \end{cases}$$

where HnSlp=1/(ThrHnHigh−ThrHnLow), and $$\text{alpha}(s) = \begin{cases} 0 & H_w\{s\} < ThrHwLow \\ 1 & H_w\{s\} > ThrHwHigh \\ HwSlp*\{H_w(s) - ThrHwLow\} & \text{otherwise} \end{cases}$$

where HwSlp=1/(ThrHwHigh−ThrHwLow). In a basic embodiments the thresholds ThrHwHigh, ThrHwLow, ThrHnHigh, ThrHnLow are predetermined constants that can be set independently for each stage of the filter; more generally, the thresholds in one stage can be dependent on other stages and these can be adaptive and responsive to image characteristics, as discussed further below.

In the example above, the coefficients are piecewise linear, being 0 below the low threshold and rising linearly to unity at the high threshold. Consequently, for smaller values of $H_n$ (below the low threshold value), β=0 and the output of the first stage will be the low-pass filtered signal $L_n$, while for values of $H_n$ over the high threshold β=1 and the output of the first stage is the same as the input, L(s). Similarly, F(s) will transition between the low pass filter $L_w$ and $L_{pF}$ as magnitude of the high pass filter value increases. More generally, other functions than the piecewise linear example, such as those with smoother transitions (e.g., sigmoid), may be implemented using a look up table or other means.

The final stage of the process (207, FIG. 2) computes the desired gain G(s) for a pixel s by nonlinear mapping of F(s). Since the image F is an edge preserving low pass filter version of the image L, it carries information on the intensity of the pixels and its surrounding narrow and wide support. A gain look up table (GainLUT) can be used to implement a user predetermined non-linear function. Thus, $$G(s)=\text{GainLUT}(F(s)).$$

The amount of gain in shadow regions as well as attenuation in highlight regions is determined by the mapping of F to the LUT content. Other compensation factors besides the exemplary case of gain, such as chromaticity (color balance), would be similarly determined. Consequently, as noted above, there may be one or more compensation factors, some of which will differ for the differing color channels. Thus, for example, pixel chromaticity adjustment can be employed to effect greater visualization of detail in the final image, in conjunction with, or separately from, pixel gain adjustment.

Generalized Embodiments

Figure 4:
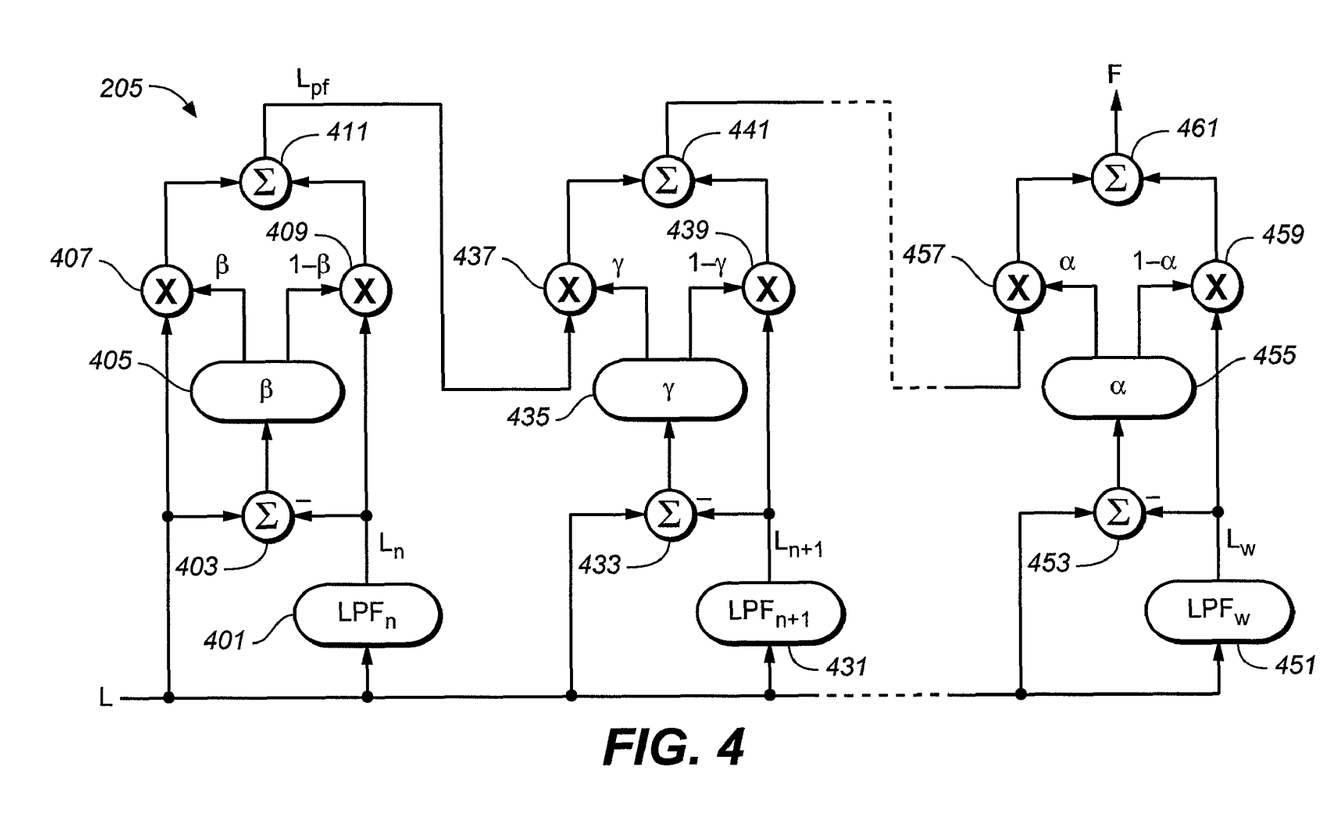
FIG. 4 shows a more general embodiment.

FIG. 4 is a generalized embodiment that incorporates one or more additional cascaded stages between the initial stage with the narrowest support window and the last stage with the widest support window. The use of these successively larger neighborhoods about the pixel fills the gap between $L_n$ and $L_w$ with additional low-pass filter sections to obtain finer edge preserving transition by cascading additional sections. The width of these windows may be set in various ways. For example, as noted above, the narrow window could be set at, say, ~5×5 pels, with the width of the wide window dependent upon the image width. These widow sizes may be user determined, or in a more general case, may be dependent on the content of the image. Some measures that may be used for this are discussed below.

Making the Selection of the Thresholds Adaptive and Responsive to Image Characteristics In each section of the cascade, depicted in FIG. 3 or 4 above, a weighting factor (for example β in the section furthest to left in FIG. 4) controls the combination between the section input L and output from its low-pass filter version Ln. The weighting factor depends on its thresholds, ThrHnLow, ThrHnHigh, with ThrHnLow<=ThrHnHigh. In the basic embodiment above, these thresholds were preset. More generally, these thresholds, and the determination of the weighting factors in general, can be made adaptive and responsive to the characteristics of the image. In the following description the first section (with narrow support filter) is used as an example. For sections n>1, the input to the section n is the output of section n−1 and L, which is the input to the section filter.

When the high pass filter data (HPF), which is the difference between the input (L) and filtered data (Hn=L−Ln), is below the low threshold (beta=0), the output of the section, LpF=beta*Hn+Ln, coincides with the filtered data (LpF=Ln). While when it is above the high threshold (that means beta=1) the output coincide with the section input (LpF=L).

The low and the high thresholds may be related to Hn. Examples may include, but not limited to the minimum, maximum, mean, median, standard deviation or other statistical measures taken from a histogram of the whole image or within a sub-image block. For example, one embodiment can set the low and the high thresholds with respect to the minimum and the maximum of Hn, respectively, mathematically represented as:

$$ThrHnLow=k1*\min(Hn), \text{ and}$$

$$ThrHnHigh=k2*\max(Hn),$$

with, for example, k1=k2=0.5, so that the dynamic range of the blending process may be adapted to the image characteristics.

In another set of embodiments, the image statistics may be better expressed by moments of distribution. For example, in a normal distribution the statistics may be sufficiently expressed by the first two moments, namely the mean and the standard deviation (std). Using this approach, the thresholds may be set as:

ThrHnLow=mean($Hn$)−$k1$*std($Hn$), and

ThrHnHigh=mean($Hn$)+$k2$*std($Hn$).

In addition, the thresholds may be used to adaptively control the contribution of each section. For example, by setting ThrHnLow<=ThrHnHigh=min(Hn), the section is adaptively bypassed (LpF=L), since Hn>=ThrHnHigh. Similarly, when ThrHnLow=max(Hn), the section uses the filtered data (LpF=Ln).

The mean and standard deviation of Hn may be extracted for the whole image, such as from a result of a preprocessing stage. In another embodiment, an estimate of these values may be taken either from a preview image (at a smaller scale), or a previous image in a sequence of images. Another alternative is to use local mean and standard deviation extracted from a sub-image block of pixels in the neighborhood of the current pixel.

Adaptively Selecting the Number of Stages Cascaded Dependent on Image Content

The general embodiment of FIGS. 3 and 4 can include 2 or more cascaded stages. The particular number of active sections in the cascade can be adaptively selected using measurements from the whole image or from sub image block, so that a number sections ranging from one to all of the available sections are applied to the image. In the exemplary embodiments, each section contains a linear filter whose window support length increases with the section number; that is, again referring to FIG. 4, the LPF of section n+1 has larger support than LPF of section n. Since a narrow support filter can track changes more locally then a filter with wider support, the local contrast may be controlled by selectively using various sections in cascade.

Various spatial measurements may be used to characterize the image content. These measurements, which can be taken together with user preference for the amount of local contrast needed, can be used to adaptively determine which and how many sections will be used. Examples of such measurements may include, but are not limited to:

(1) The local magnitude of one or more of the high-pass filters (e.g. Hn) and its sign may help to measure local edges and their direction (rising or falling edge) within the image or some sub-image block. In this case measurements are taken locality with relation to the support of the section filter.

(2) Spatial frequencies as obtained from the image or sub image block, by frequency domain tools such as Discrete Cosine Transforms (DCT). A spatial frequency is detected in the image or sub image block when its coefficient is above a given threshold.

CONCLUSION

Although the various aspects of the present invention have been described with respect to exemplary embodiments thereof, it will be understood that the present invention is entitled to protection within the full scope of the appended claims.

It is claimed:

1. A method of compensating the dynamic range of a set of image data, comprising:
   receiving a measure of an image strength at a pixel of the set of image data;
   using the measure of the image strength at the pixel as an input of a first filter stage, where the first filter stage is a two dimensional filter formed from a first neighborhood of the pixel;
   using the measure of the image strength at the pixel and an output of the first filter stage as inputs of a second filter stage, where the second filter stage is a two dimensional filter formed from a second neighborhood of the pixel and wherein the second neighborhood is of greater extent than the first neighborhood; and
   determining one or more compensation factors for the pixel based on an output of the second filter stage.

2. The method of claim 1, wherein the measure of the image strength at the pixel is a gray image extracted from a pixel signal.

3. The method of claim 2, wherein said gray image is derived from the logarithm of the maximum of red, green, and blue values at the pixel.

4. The method of claim 1, wherein the first and second filters are low-pass filters.

5. The method of claim 1, wherein the output of the first filter is a linear combination of the measure of the image strength and a low-pass filtered version of the measure of the image strength.

6. The method of claim 5, wherein the low-pass filtered version of the measure of the image strength uses a two dimensional low-pass filter having window support of the first neighborhood of the pixel.

7. The method of claim 5, wherein coefficients of the linear combination are based on a high-pass filtered version of the measure of the image strength.

8. The method of claim 1, wherein the output of the second filter is a linear combination of the measure of the output of the first filter and a low-pass filtered version of the measure of the image strength.

9. The method of claim 8, wherein the low-pass filtered version of the measure of the image strength uses a two dimensional low-pass filter having window support of the second neighborhood of the pixel.

10. The method of claim 8, wherein coefficients of the linear combination are based on a high-pass filtered version of the measure of the image strength.

11. The method of claim 1, where the one or more compensation factors include one or more gain factors determined based on the output of the second filter stage.

12. The method of claim 11, wherein the one or more gain factors are determined by the use of a look up table based on the output of the second filter.

13. The method of claim 1, where the one or more compensation factors include a chromaticity factor determined based on the output of the second filter stage.

14. The method of claim 13, wherein the chromaticity factor is determined by the use of a look up table based on the output of the second filter.

15. The method of claim 1, wherein a size of the first neighborhood is user determined.

16. The method of claim 1, wherein a size of the second neighborhood is dependent on a width image of the set of image data.

17. The method of claim 1, wherein a size of the second neighborhood is user determined.

18. The method of claim 1, wherein the set of image data is in RGB format.

19. The method of claim 18, wherein said one or more compensation factors for the pixel are used for each of the R, G, and B components of the set of image data in ROB format for said pixel.

20. The method of claim 18, wherein said one or more compensation factors for the pixel are used for components of the set of image data in a format other than the RGB format for said pixel.

21. The method of claim 1, wherein the set of image data is from a still image.

22. The method of claim 1, wherein the set of image data is from a video sequence.

23. A method of compensating dynamic range of a set of image data, comprising:
 filtering through a number of cascaded filter stages a measure of an image strength at a pixel of the set of image data, wherein the number of stages is dependent on the set of image data and wherein each stage has larger support than the preceding stages; and
 determining one or more compensation factors for the pixel based on an output of the number of cascaded filters.

24. The method of claim 23, where the one or more compensation factors include one or more gain factors.

25. The method of claim 23, where the one or more compensation factors include a chromaticity factor.

26. The method of claim 23, wherein the number of stages is determined based on local information within the image data.

27. The method of claim 26, wherein the number of stages is determined based on a magnitude of a high-pass filtering within one of the filter stages.

28. The method of claim 26, wherein the number of stages is determined based on local information within a portion of the image data.

29. The method of claim 23, wherein the number of stages is determined based on frequency domain information of the image data.

30. The method of claim 29, wherein the number of stages is determined based on a discreet cosine transformation.

31. The method of claim 29, wherein the number of stages is determined based on frequency domain information of a portion of the image data.

32. The method of claim 23, wherein set of image data is in RGB format.

33. The method of claim 32, wherein said one or more compensation factors for the pixel is used for each of the R, G, and B components of the set of image data in KGB format for said pixel.

34. The method of claim 32, wherein said one or more compensation factors for the pixel is used for components of the set of image data in a format other than the KGB format for said pixel.

35. The method of claim 23, wherein the set of image data is from a still image.

36. The method of claim 23, wherein the set of image data is from a video sequence.

37. A method of compensating dynamic range of a set of image data, comprising:
 filtering through a plurality of filter stages a measure of an image strength at a pixel of the set of image data, the stages including:
  a first stage having as input said measure and having as output a combination of said measure and a low-pass filtered version of said measure, the combination being dependent upon one or more parameters; and
  one or more second stages each having as input said measure and an output of the preceding stage and each having as output a combination of the output of the preceding stage and a low-pass filtered version of said measure, each of said combinations being dependent upon one or more parameters,
 wherein one or more of the parameters upon which one or more of said combinations are dependent is derived based upon characteristics of the set of image data; and
 determining one or more compensation factors for the pixel based on a last output of the filter stages.

38. The method of claim 37, where the one or more compensation factors include one or more gain factors.

39. The method of claim 37, where the one or more compensation factors include a chromaticity factor.

40. The method of claim 37, where said characteristics include statistical measures based on a histogram of a whole image corresponding to the set of image data.

41. The method of claim 40, where the statistical measures include a maximum of the histogram of the whole image corresponding to the set of image data.

42. The method of claim 40, where the statistical measures include a minimum of the histogram of the whole image corresponding to the set of image data.

43. The method of claim 40, where the statistical measures include a distribution moment of the histogram of the whole image corresponding to the set of image data.

44. The method of claim 37, where said characteristics include statistical measures based on a histogram of a sub-image block of a whole image corresponding to the set of image data.

45. The method of claim 44, where the statistical measures include a maximum of the histogram of the sub-image block.

46. The method of claim 44, where the statistical measures include a minimum of the histogram of the sub-image block.

47. The method of claim 44, where the statistical measures include a distribution moment of the histogram of the sub-image block.

48. The method of claim 37, wherein the output of the first stage is said measure when a second threshold is set to a minimum of the high-pass version of said measure, and a low-pass filtered version of said measure when a first threshold is set to a maximum of the high-pass version of the said measure.

49. The method of claim 37, wherein the output of one or more of the second stages is the output of the preceding stage when a second threshold is set to a minimum of the high-pass version of the said measure, and a low-pass filtered version of said measure when a first threshold is set to a maximum of the high-pass version of the said measure.

50. An image processing unit, including:
 an image intensity determination section to provide a measure of an image strength at a pixel of a set of image data;
 a filter section having:
  a first filter stage having as input the measure of the image strength at the pixel, where the first filter stage is a two dimensional filter formed from a first neighborhood of the pixel; and
  a second filter stage having as inputs the measure of the image strength at the pixel and the output of the first filter stage, where the second filter stage is a two dimensional filter formed from a second neighborhood of the pixel and wherein the second neighborhood is of greater extent than the first neighborhood; and a dynamic range compensation section to compensate input values of the pixel by one or more factors for the pixel based on an output of the second filter stage.

51. The image processing unit of claim 50, wherein the measure of the image strength at the pixel is a gray image extracted from a pixel signal.

52. The image processing unit of claim 51, wherein said gray image is derived from a logarithm of a maximum of red, green, and blue values at the pixel.

53. The image processing unit of claim 50, wherein the first and second filter stages are low-pass filters.

54. The image processing unit of claim 50, wherein the output of first filter stage is a linear combination of the measure of the image strength and a low-pass filtered version of the measure of the image strength.

55. The image processing unit of claim 54, wherein the low-pass filtered version of the measure of the image strength uses a two dimensional low-pass filter having window support of the first neighborhood of the pixel.

56. The image processing unit of claim 54, wherein coefficients of the linear combination are based on a high-pass filtered version of the measure of the image strength.

57. The image processing unit of claim 50, wherein the output of the second filter stage is a linear combination of the measure of the output of the first filter and a low-pass filtered version of the measure of the image strength.

58. The image processing unit of claim 57, wherein the low-pass filtered version of the measure of the image strength uses a two dimensional low-pass filter having window support of the second neighborhood of the pixel.

59. The image processing unit of claim 57, wherein coefficients of the linear combination are based on a high-pass filtered version of the measure of the image strength.

60. The image processing unit of claim 57, wherein the one or more dynamic range compensation factors include one or more gain factors determined based on the output of the second filter stage.

61. The image processing unit of claim 60, wherein the one or more gain factors are determined by use of a look up table based on the output of the second filter.

62. The image processing unit of claim 57, wherein the one or more dynamic range compensation factors include a chromaticity factor determined based on the output of the second filter stage.

63. The image processing unit of claim 62, wherein the chromaticity factor is determined by the use of a look up table based on the output of the second filter.

64. The image processing unit of claim 57, wherein a size of the first neighborhood is user determined.

65. The image processing unit of claim 57, wherein a size of the second neighborhood is dependent on a width image of the set of image data.

66. The image processing unit of claim 57, wherein a size of the second neighborhood is user determined.

67. The image processing unit of claim 57, wherein the set of image data is in KGB format.

68. The image processing unit of claim 67, wherein said one or more dynamic range compensation factors for the pixel are used for each of the R, G, and B components of the set of image data in KGB format for said pixel.

69. The image processing unit of claim 67, wherein said one or more dynamic range compensation factors for the pixel are used for components of the set of image data in a format other than the RGB format for said pixel.

70. The image processing unit of claim 57, wherein the set of image data is from a still image.

71. The image processing unit of claim 57, wherein the set of image data is from a video sequence.

72. An image processing unit, including:
an image intensity determination section to provide a measure of an image strength at a pixel of a set of image data;
a filter section having as input the measure of the image strength at the pixel and comprising a plurality of cascaded filter stages, wherein each stage has larger support than the preceding stages and wherein the image processing unit determines a number of active stages based on the set of image data; and
a dynamic range compensation section to compensate input values of the pixel by one or more factors for the pixel based on an output of the plurality of cascaded filters.

73. The image processing unit of claim 72, where the one or more dynamic range compensation factors include one or more gain factors.

74. The image processing unit of claim 72, where the one or more dynamic range compensation factors includes a chromaticity factor.

75. The image processing unit of claim 72, wherein the number of active stages is determined based on local information within the image data.

76. The image processing unit of claim 75, wherein the number of active stages is determined based on a magnitude of a high-pass filtering within one of the filter stages.

77. The image processing unit of claim 75, wherein the number of active stages is determined based on local information within a portion of the image.

78. The image processing unit of claim 72, wherein the number of active stages is determined based on frequency domain information of the image data.

79. The image processing unit of claim 78, wherein the number of active stages is determined based on a discreet cosine transformation.

80. The image processing unit of claim 78, wherein the number of active stages is determined based on frequency domain information of a portion of the image.

81. The image processing unit of claim 72, wherein the set of image data is in RGB format.

82. The image processing unit of claim 81, wherein said one or more dynamic range compensation factors for the pixel are used for each of the R, G, and B components of the set of image data in RGB format for said pixel.

83. The image processing unit of claim 81, wherein said one or more dynamic range compensation factors for the pixel are used for components of the set of image data in a format other than the RGB format for said pixel.

84. The image processing unit of claim 72, wherein the set of image data is from a still image.

85. The image processing unit of claim 72, wherein the set of image data is from a video sequence.

86. An image processing unit, including:
an image intensity determination section to provide a measure of an image strength at a pixel of a set of image data;
a filter section having:
a first stage having as input said measure and having as output a combination of said measure and a low-pass filtered version of said measure, the combination being dependent upon one or more parameters; and
one or more second stages each having as input said measure and an output of the preceding stage and each having as output a combination of the output of the preceding stage and a low-pass filtered version of said measure, each of said combinations being dependent upon one or more parameters, wherein the image processing unit derives one or more of the parameters upon which one or more of said combinations are dependent based upon characteristics of the set of image data; and a dynamic range compensation section to compensate input values of the pixel by one or more factors for the pixel based on an output of a last filter stage.

87. The image processing unit of claim 86, where the one or more dynamic range compensation factors include one or more gain factors.

88. The image processing unit of claim 86, where the one or more dynamic range compensation factors includes a chromaticity factor.

89. The image processing unit of claim 86, where said characteristics include statistical measures based on a histogram of a whole image corresponding to the set of image data.

90. The image processing unit of claim 89, where the statistical measures include a maximum of the histogram of the whole image corresponding to the set of image data.

91. The image processing unit of claim 89, where the statistical measures include a minimum of the histogram of the whole image corresponding to the set of image data.

92. The image processing unit of claim 89, where the statistical measures include a distribution moment of the histogram of the whole image corresponding to the set of image data.

93. The image processing unit of claim 86, where said characteristics include statistical measures based on a histogram of a sub-image block of a whole image corresponding to the set of image data.

94. The image processing unit of claim 93, where the statistical measures include a maximum of the histogram of the sub-image block.

95. The image processing unit of claim 93, where the statistical measures include a minimum of the histogram of the sub-image block.

96. The image processing unit of claim 93, where the statistical measures include a distribution moment of the histogram of the sub-image block.

97. The image processing unit of claim 86, wherein the output of the first stage is said measure when a high-pass version of said measure is above a first threshold, and a low-pass filtered version of said measure when the high-pass version of said measure is below a second threshold, wherein said thresholds are parameters based upon the characteristics of the set of image data.

98. The image processing unit of claim 86, wherein the output of one or more of the second stages is the output of the preceding stage when a high-pass version of said measure is above a first threshold, and a low-pass filtered version of said measure when the high-pass version of said measure is below a second threshold, wherein said thresholds are parameters based upon the characteristics of the set of image data.

99. A method of compensating the dynamic range of a set of image data, comprising:
receiving a measure of an image strength at a pixel of the set of image data;
using the measure of the image strength at the pixel as an input of one or more cascaded filter stages, where each of the cascaded filter stages is a two dimensional filter formed from a corresponding neighborhood of the pixel; and
determining a chromaticity factor for the pixel based on the output of the filter stages.

100. The method of claim 99, wherein the one or more cascaded filter stages includes at least first and second cascaded filter stages, a neighborhood corresponding to the second filter stage being of greater extent than a neighborhood corresponding to the first filter stage.

101. The method of claim 99, wherein the number of cascaded filter stages is dependent on the set of image data and wherein each of the cascaded filter stages has larger support than the preceding cascaded filter stages.

102. The method of claim 99, wherein the chromaticity factor is determined by the use of a look up table based on the output of the filter stages.

103. An image processing unit, including:
an image intensity determination section to provide a measure of an image strength at a pixel of a set of image data;
a filter section having one or more cascaded filter stages, where each of the cascaded filter stages is a two dimensional filter formed from a corresponding neighborhood of the pixel; and
a dynamic range compensation section to compensate input values of the pixel by one or more chromaticity factors for the pixel based on an output of a second filter stage.

104. The image processing unit of claim 103, wherein the one or more cascaded filter stages includes at least first and second cascaded filter stages, a neighborhood corresponding to the second filter stage being of greater extent than a neighborhood corresponding to the first filter stage.

105. The image processing unit of claim 103, wherein the number of filter stages is dependent on the set of image data and wherein each of the cascaded filter stages has larger support than the preceding stages.

106. The image processing unit of claim 103, wherein a chromaticity factor is determined by the use of a look up table based on the output of the filter stages.

* * * * *